United States Patent
Leitel et al.

(10) Patent No.: US 10,774,663 B2
(45) Date of Patent: Sep. 15, 2020

(54) DEVICE FOR EXHAUST-GAS ROUTING HAVING A TURBOCHARGER

(71) Applicant: MAN Truck & Bus AG, Munich (DE)

(72) Inventors: Thomas Leitel, Schwabach (DE); Dominik Polster, Berg (DE)

(73) Assignee: MAN TRUCK & BUS AG, Munich (DE)

( * ) Notice: Subject to any disclaimer, the term of this patent is extended or adjusted under 35 U.S.C. 154(b) by 127 days.

(21) Appl. No.: 15/851,981

(22) Filed: Dec. 22, 2017

(65) Prior Publication Data

US 2018/0179907 A1 Jun. 28, 2018

(30) Foreign Application Priority Data

Dec. 22, 2016 (DE) .................. 10 2016 015 306

(51) Int. Cl.
*F01D 9/04* (2006.01)
*F04D 1/00* (2006.01)
*F02B 37/18* (2006.01)
*F01N 13/08* (2010.01)
*F02B 37/22* (2006.01)
(Continued)

(52) U.S. Cl.
CPC .......... *F01D 9/045* (2013.01); *F01D 25/243* (2013.01); *F01N 13/08* (2013.01); *F01N 13/10* (2013.01); *F02B 37/18* (2013.01); *F04D 1/00* (2013.01); *B22D 25/02* (2013.01); *F01N 13/1805* (2013.01); *F01N 2340/06* (2013.01); *F01N 2590/08* (2013.01); *F02B 37/225* (2013.01);
(Continued)

(58) Field of Classification Search
CPC .... F01D 25/243; F01D 9/045; F05D 2220/40; F05D 2250/71; F01N 13/08; F01N 13/10; F01N 13/1805; F01N 2340/06; F01N 2590/08; Y02T 10/144; Y10T 29/49988; Y10T 29/49989; Y10T 29/49995
USPC ................ 60/602, 605.2; 29/428, 557, 527.5
See application file for complete search history.

(56) References Cited

U.S. PATENT DOCUMENTS 4,463,564 A * 8/1984 McInerney ........... F01D 17/105
137/892
4,789,300 A * 12/1988 Swearingen ............ F01D 5/048
415/148
(Continued)

FOREIGN PATENT DOCUMENTS

DE 19503748 A1 6/1996
EP 0477579 A2 4/1992
(Continued)

OTHER PUBLICATIONS

German Search Report dated Aug. 29, 2017 in corresponding German Patent Application No. 10 2016 015 306.7, 9 pages.
(Continued)

*Primary Examiner* — Thai Ba Trieu
*Assistant Examiner* — Dapinder Singh
(74) *Attorney, Agent, or Firm* — Weber Rosselli & Cannon LLP

(57) ABSTRACT

A turbocharger assembly for an internal combustion engine, in particular of a commercial vehicle, has a turbocharger with a turbine housing. The turbocharger assembly additionally has an exhaust-gas pipe. The exhaust-gas pipe is arranged downstream of the turbine housing. The exhaust-gas pipe has a diffusor region and an exhaust-gas manifold region.

22 Claims, 2 Drawing Sheets

(51) Int. Cl.
    *F01D 25/24*     (2006.01)
    *F01N 13/10*     (2010.01)
    *F01N 13/18*     (2010.01)
    *B22D 25/02*     (2006.01)

(52) U.S. Cl.
    CPC ...... *F05D 2220/40* (2013.01); *F05D 2250/71* (2013.01); *Y02T 10/144* (2013.01)

(56) References Cited

U.S. PATENT DOCUMENTS

| | | |
|---|---|---|
| 6,202,413 B1 | 3/2001 | Baker et al. |
| 6,978,615 B2 * | 12/2005 | Jones ............... F01D 9/026 60/602 |
| 8,037,683 B2 * | 10/2011 | Wirbeleit ............ F01D 17/12 60/602 |
| 9,039,353 B2 * | 5/2015 | Ramb ............... F01D 17/105 415/145 |
| 2014/0314590 A1 | 10/2014 | Ising |

FOREIGN PATENT DOCUMENTS

| | | |
|---|---|---|
| EP | 1574681 A1 | 9/2005 |
| WO | 2013/142090 A1 | 9/2013 |
| WO | 2014/095003 A1 | 6/2014 |
| WO | 2015/145498 A1 | 10/2015 |

OTHER PUBLICATIONS

European Search Report dated Mar. 5, 2018 and issued in corresponding European Patent Application No. 17202946.

\* cited by examiner

DEVICE FOR EXHAUST-GAS ROUTING HAVING A TURBOCHARGER

FIELD OF THE DISCLOSURE

The present disclosure relates to a device for exhaust-gas routing, in particular a turbocharger assembly, for an internal combustion engine. The present disclosure further relates to a motor vehicle, in particular a commercial vehicle, having a turbocharger assembly.

BACKGROUND

In order to increase the power or efficiency of internal combustion engines, use may be made of turbochargers or exhaust-gas turbochargers (EGTs). A turbocharger has a compressor for inlet air and an exhaust-gas turbine. The compressor is integrated in the air intake system of the internal combustion engine to increase the air throughput and to reduce the suction work of the pistons of the internal combustion engine. The compressor of the turbocharger is driven by the exhaust-gas turbine Specifically, a turbine wheel of the exhaust-gas turbine drives a compressor wheel of the compressor by means of a shaft which rotates with the turbine wheel. During operation, hot exhaust gases from the combustion chambers of the internal combustion engine flow through the turbine wheel of the exhaust-gas turbine and consequently drive said turbine wheel. Downstream of the turbine wheel, a diffusor is provided in the turbine housing for improving the outflow of the exhaust gas from the turbine wheel. The use of the diffusor makes it possible to improve the efficiency of the exhaust-gas turbine. The diffusor can be cast as a region of the turbine housing. This means that exhaust gas flowing through the exhaust-gas turbine requires a design of the thermally highly loaded turbine housing that is tailored to said exhaust gas.

In confined installation situations, it may be necessary to connect an exhaust-gas manifold to an outlet of the turbine of the turbocharger. The exhaust-gas manifold allows a deflection of the flow direction of the exhaust gas for channeling it into further components of the exhaust-gas system, for example modules for exhaust-gas aftertreatment.

The diffusor length is limited through its integration into the turbine housing. Moreover, a relatively long diffusor, and thus a relatively large and relatively long turbine housing, has a negative impact in terms of the installation space and the arrangement of components of the exhaust-gas train that are provided downstream. In particular, it may be necessary for an exhaust-gas manifold provided downstream to be provided with a smaller bending radius, i.e. to curve the exhaust-gas manifold more significantly. An exhaust-gas manifold having a smaller bending radius has a negative impact on the outflow from the exhaust-gas turbine and can reduce the efficiency of the exhaust-gas turbine.

SUMMARY

It is therefore an aspect of the present disclosure to provide a device for exhaust-gas routing having a turbocharger, a diffusor and an exhaust-gas manifold that allows improved utilization of the limited installation space and in particular allows a large bending radius of the exhaust-gas manifold in order to increase the efficiency of the turbocharger. A further aspect of the present disclosure can be considered that of allowing an improved design of the thermally highly loaded turbine housing without negatively influencing the gas flow through the turbine housing.

These aspects are achieved by means of a device for exhaust-gas routing, in particular a turbocharger assembly.

The turbocharger assembly has a turbocharger (exhaust-gas turbocharger) with a turbine housing. The turbine housing can be part of a turbocharger housing which additionally has a compressor housing. The turbine housing can be a cast part and receive a rotatable turbine wheel which is drivingly connected to a compressor wheel via a shaft.

The turbocharger assembly further has an exhaust-gas pipe. The exhaust-gas pipe is arranged downstream of the turbine housing. The exhaust-gas pipe comprises a diffusor region and an exhaust-gas manifold region. The exhaust-gas pipe can be an exhaust-gas manifold into which a diffusor is integrated. The diffusor (region) is defined by an increase in size of the exhaust-gas pipe cross section, i.e. of the through-flow cross section, in the flow direction of the flowing medium, i.e. of the exhaust gas. The exhaust-gas manifold (region) is defined by a curved structural shape which results in a change of the flow direction of the flowing medium along the curved structural shape of the exhaust-gas manifold.

The provision according to the present disclosure of the diffusor region in the exhaust-gas pipe offers the particular advantage that the diffusor region is formed independently of the turbine housing. Restrictions in terms of the design of the turbine housing which result from the hitherto necessary integration of the diffusor into the turbine housing can thus be eliminated. As a result, the thermally highly loaded turbine housing can be optimally configured without having to make compromises with respect to the gas flow downstream of the turbine wheel. Moreover, the length of the diffusor region can preferably be increased by its provision in the exhaust-gas pipe without having an increase of the turbine housing as a result. The turbine housing can have, for example, a flange region which is provided in the direct vicinity of the turbine wheel and intended for flanging on the exhaust-gas pipe.

In this regard, a particularly embodiment provides that the diffusor region extends at least partially into the turbine housing. It is particularly advantageous here if the diffusor region extends substantially completely into the turbine housing. To receive the diffusor region of the exhaust-gas pipe, the turbine housing can have a (pipe-)receiving region which extends from an outlet opening of the turbine housing into the turbine housing. Thus, an at least installation-space-neutral and, possibly, installation-space-optimized arrangement of turbine housing, diffusor and exhaust-gas manifold can be ensured. Moreover, such a design allows the use of the present disclosure without complex adaptation of the turbine housing and of the exhaust-gas pipe. Instead of the diffusor, a receiving region for at least partially receiving the diffusor region of the exhaust-gas pipe is provided in the turbine housing. The exhaust-gas pipe can be lengthened at the flange region towards the turbine housing by the diffusor region, with the result that said exhaust pipe extends by way of the diffusor region into the turbine housing. Furthermore, this exemplary embodiment makes it possible, in particular in the case of small space conditions, for the exhaust-gas manifold region to be able to be provided with a gentle, i.e. large, bending radius and thus to be flow-optimized. A large bending radius improves the outflow from the turbine and thus the turbocharger efficiency.

According to a further embodiment variant, the exhaust-gas pipe is formed in one piece. As a result, the number of parts does not increase. Furthermore, only one turbine housing and one exhaust-gas pipe or exhaust-gas manifold are required. The one-piece design additionally allows an integration of the diffusor region and of the exhaust-gas manifold region. For example, the regions can (partially or completely) overlap, or an optimized transition between the regions can be provided. In addition, mounting is facilitated since the diffusor region and the exhaust-gas manifold region are mounted jointly during the mounting of the exhaust-gas pipe.

Alternatively or in addition, the exhaust-gas pipe can be a cast part, so that in particular the inner geometry of the exhaust-gas pipe which defines the diffusor region and the exhaust-gas manifold region is formed in a simple manner by a casting process. The cast part can consist, for example, of a cast iron.

The turbocharger assembly advantageously has a wastegate duct which has at least one passage, preferably a plurality of passages. The passage or the passages extends or extend through a pipe wall of the exhaust-gas pipe between an outer circumferential surface of the exhaust-gas pipe and an inner circumferential surface of the exhaust-gas pipe. The passage or the passages serves or serve as outlet regions of the wastegate duct. The region of the wastegate duct that is provided upstream of the at least one passage extends through the turbine housing. The wastegate duct is a duct (bypass duct) for bypassing the turbine wheel, which duct extends from an inlet upstream of the turbine wheel to an outlet downstream of the turbine wheel. A wastegate valve or flap for opening, closing and partially opening the wastegate duct can be arranged in the wastegate duct.

According to a further embodiment variant, the at least one passage is provided downstream of the diffusor region and/or upstream of the exhaust-gas manifold region. In particular, an outlet opening of the at least one passage is provided downstream of the diffusor region and/or upstream of the exhaust-gas manifold region. It is thus ensured that when the exhaust gas flows out of the passage or passages into the exhaust-gas pipe, there occurs no or only a slight impairment (disturbance) of the exhaust-gas flow flowing through the diffusor region and/or the exhaust-gas manifold region.

In a further exemplary embodiment, the at least one passage is formed such that a flow through the passage is channeled into the exhaust-gas pipe such that the flow from the passage impinges a flow through the exhaust-gas pipe at an angle of less than 90°. In other words, the inflow angle from the passage or passages is less than 90°. As a result, the swirling which occurs during inflow from the passage into the exhaust-gas pipe is reduced. Said angle is preferably less than 45°, in particular less than 25°, with the result that the flow from the passage can hug or bear particularly well against the flow in the exhaust-gas pipe. The passage or passages can additionally be designed in nozzle form or as nozzles of the wastegate duct.

A plurality of passages of the wastegate duct through the pipe wall of the exhaust-gas pipe are preferably provided. They are arranged in particular at equal spacings in a circumferential direction about a longitudinal axis of the exhaust-gas pipe. This allows a symmetrical inflow from the wastegate duct into the exhaust-gas pipe. Also conceivable, however, are asymmetrical arrangements of a plurality of passages in a circumferential direction about a longitudinal axis of the exhaust-gas pipe, in particular in embodiments in which the outlet openings are arranged in the exhaust-gas manifold region. The wastegate duct can have an annular duct portion or annular space which is arranged upstream of the passages. The annular duct portion can allow an inflow into the passages which is as uniform as possible. The annular duct portion can be formed between the turbine housing and the exhaust-gas pipe. An outer circumferential surface of the exhaust-gas pipe can at least partially form an inner circumferential surface (inner shell surface) of the annular duct portion. An inner circumferential surface of the turbine housing can at least partially form an outer circumferential surface (outer shell surface) of the annular duct portion.

An inlet opening of the at least one passage is advantageously formed by a metal-cutting process. For example, the inlet opening can be formed by turning. Thus, it is possible that the inlet opening of the passage is not yet present after the primary forming process, for example casting. Only the metal-cutting process "opens" the passage on the inlet side. For example, the inlet opening can be formed by transverse turning, cylindrical turning, profile turning and contour turning.

Additionally or alternatively, an outlet opening of the at least one passage is formed by a casting process. The outlet opening is thus already created during primary forming and does not have to be produced in a complicated manner within the exhaust-gas pipe by a metal-cutting process after primary forming. Moreover, casting allows particularly pliable structures of the outlet opening. The passage can merge uniformly or evenly into an inner circumferential surface of the exhaust-gas pipe via the outlet opening formed by a casting process.

According to a further embodiment, the diffusor region and the exhaust-gas manifold region overlap at least partially, for example substantially completely. The diffusor region is curved in the overlapping portion. Said region can, for example, allow a lengthening of the diffusor and installation space optimization. The overlapping portion between the diffusor region and exhaust-gas manifold region can be provided in the turbine housing or outside the turbine housing. Alternatively or in addition, the diffusor region can extend at least partially rectilinearly. The rectilinear portion can be arranged in particular in the turbine housing.

In a further exemplary embodiment, the exhaust-gas pipe further has a flange region. The flange region is designed to flange the exhaust-gas pipe on the turbine housing. The flange region is arranged downstream of an inlet opening of the exhaust-gas pipe, preferably downstream of the diffusor region and/or upstream of the exhaust-gas manifold region. The flange region can extend partially, in portions or completely about an outer circumference of the exhaust-gas pipe. The flange region can extend in collar form in the circumferential direction and radially outwards. The flange region can have a flange end surface which is formed as an annular surface. The turbine housing can have a correspondingly formed annular surface for contacting the flange end surface. The flange region of the turbine housing and the flange region of the exhaust-gas pipe can be sealingly connected via an annular body, for example a flange clamp or a clamping band.

In addition, the at least one passage can extend at least partially through the flange region. By virtue of its material thickness (i.e. pipe thickness of the exhaust-gas pipe in the flange region), the flange region offers the possibility of allowing a flow-optimized course of the passage in particular in terms of the inflow into the exhaust-gas pipe. The flange region can have a step-shaped design, for example. The inlet opening of the passage can be provided in an annular surface of the flange region that extends radially outwards with respect to a longitudinal axis of the exhaust-gas pipe. Alternatively or in addition, the inlet opening can be provided, for example, in a circumferential surface of the flange region that extends coaxially to the longitudinal axis of the exhaust-gas pipe. Thus, the inlet openings can be produced, for example, by a metal-cutting process such as turning at the same time as the flange region is being machined.

The present disclosure further relates to a motor vehicle, in particular a commercial vehicle, having a device for exhaust-gas routing, in particular a turbocharger assembly, as disclosed herein.

According to a further aspect of the present disclosure, a turbocharger can be provided alone (i.e. without exhaust-gas pipe). The turbocharger has a turbine housing with a pipe-receiving region. The pipe-receiving region is designed to receive a pipe, with the result that the pipe extends at least partially into the turbine housing. The pipe-receiving region can be provided downstream of a turbine wheel and receive, for example, a diffusor, for example in the form of a diffusor pipe, a diffusor pipe segment or a diffusor region of an exhaust-gas pipe. Additionally or alternatively, the pipe-receiving region can also be provided upstream of a turbine wheel of the exhaust-gas turbocharger. Such a turbocharger in particular achieves the object of improving the design of the thermally highly loaded turbine housing.

According to a further different aspect of the present disclosure, an exhaust-gas pipe as disclosed herein can likewise be provided alone (i.e. without turbocharger). The exhaust-gas pipe has a diffusor region and an exhaust-gas manifold region. The diffusor region can be designed to extend into a turbine housing of a turbocharger. The exhaust-gas pipe can be provided in one piece and/or as a cast part. The exhaust-gas pipe can be designed as disclosed herein.

The above-described embodiments and features of the present disclosure can be combined with one another as desired. Further details and advantages of the present disclosure are described below with reference to the appended drawings, in which:

DETAILED DESCRIPTION

Figure 1:
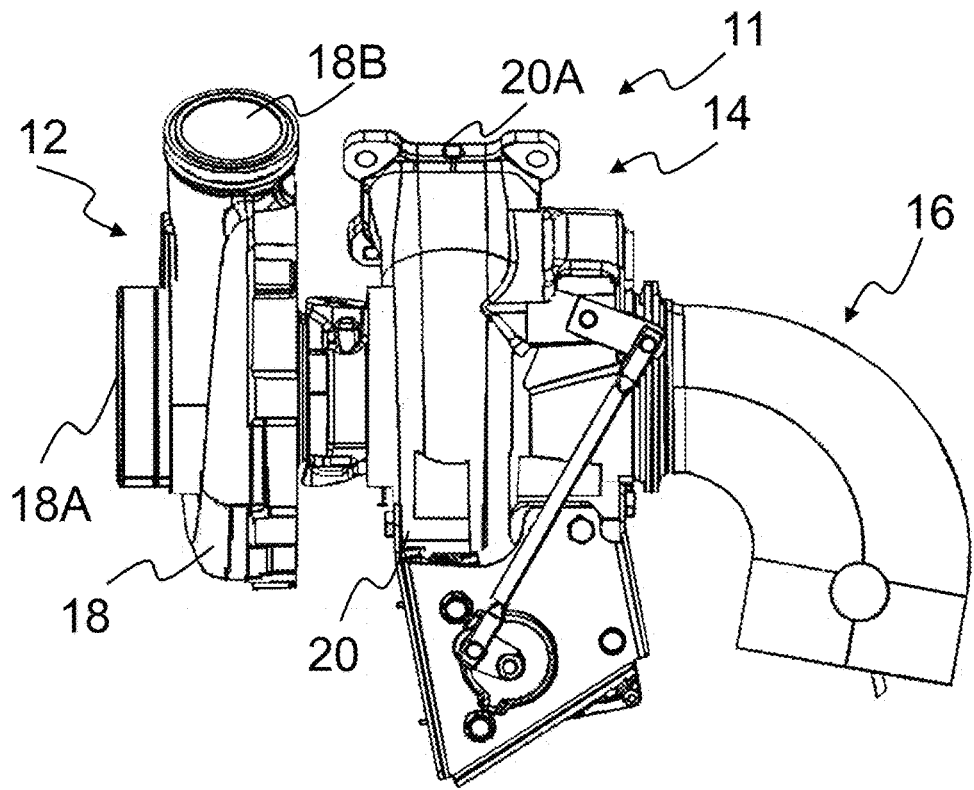
FIG. 1 shows a plan view of a turbocharger assembly.

FIG. 1 shows a device for exhaust-gas routing that is designed as a turbocharger assembly 10. The turbocharger assembly 10 has a turbocharger 11 with a compressor 12 and a turbine 14. The turbocharger assembly 10 further has an exhaust-gas pipe 16.

The compressor 12 is part of an air inlet system of an internal combustion engine (not shown). The compressor 12 comprises a compressor housing 18 and a compressor wheel (not shown) which is rotatably mounted in the compressor housing 18 and intended for compressing the inlet air. The inlet air flows at a compressor inlet opening 18A into the compressor 12 and is compressed therein by the compressor wheel. The compressed inlet air leaves the compressor 12 through a compressor outlet opening 18B. The compressor wheel is driven by a shaft which in turn is driven by a turbine wheel of the turbine 14.

The turbine wheel of the turbine 14 is rotatably mounted in a turbine housing 20. The turbine wheel is driven by hot exhaust gas which expands against the blades of the turbine wheel. The turbine 14 is part of an exhaust-gas system of the internal combustion engine. The turbine 14 is arranged downstream of the combustion chamber(s) of the internal combustion engine. Hot exhaust gases flow into the turbine 14 through a turbine inlet opening 20A and flow through the turbine wheel. After flowing through the turbine wheel, the exhaust gases flow into the exhaust-gas pipe 16.

The exhaust-gas pipe 16 is arranged downstream of the turbine 14 or the turbine housing 20. The exhaust-gas pipe 16 is designed as an exhaust-gas manifold and serves for deflecting the exhaust-gas flow from the turbine 14. The exhaust-gas pipe 16 can have a braking flap (throttle flap).

Figure 2:
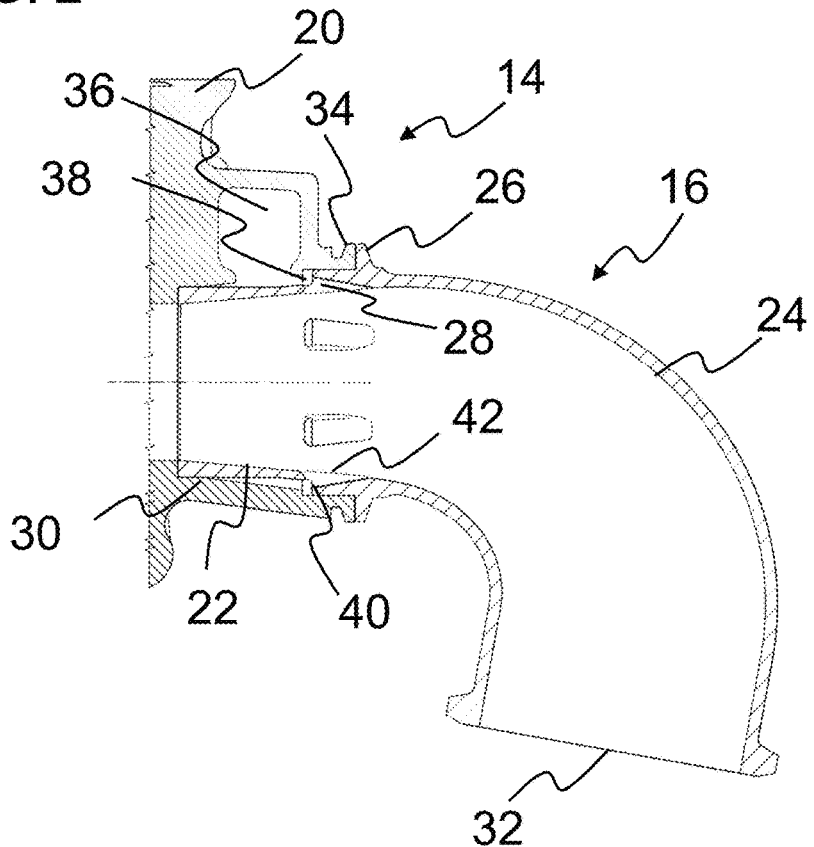
FIG. 2 shows a sectional view of an exhaust-gas pipe and of an outlet region of a turbine housing of a turbocharger.

As is shown in FIG. 2, the exhaust-gas pipe 16 extends partially into the turbine housing 20. Specifically, the exhaust-gas pipe 16 has a diffusor region 22, an exhaust-gas manifold region 24, a flange region 26 and a plurality of passages 28. In the exemplary embodiment shown, the exhaust-gas pipe 16 is formed in one piece as a cast part. The exhaust-gas pipe 16 can also consist of a plurality of pipe segments, for example a diffusor pipe segment and an exhaust-gas manifold pipe segment, which are connected to one another via a flange, for example.

The diffusor region 22 is provided substantially completely in an exhaust-gas-pipe-receiving region 30 of the turbine housing 20. The diffusor region 22 is characterized by a cross-sectional widening along the flow direction. The diffusor region 22 is provided directly downstream of the turbine wheel. In the example shown, the diffusor region 22 extends rectilinearly. In other exemplary embodiments, the diffusor region 22 can be curved and in particular overlap with the exhaust-gas manifold region 24. The diffusor region 22 can also at least partially extend outside the turbine housing 20.

The exhaust-gas manifold region 24 is provided downstream of the diffusor region 22. The exhaust-gas manifold region 24 is characterized by a bending radius by means of which the flow in the exhaust-gas manifold region 24 is deflected. For example, modules for exhaust-gas aftertreatment etc. can be flanged onto an outlet opening 32 of the exhaust-gas manifold region 24 or of the exhaust-gas pipe 16.

The exhaust-gas pipe 16 is connected via the flange region 26 to a flange region 34 of the turbine housing 20. An annular (band) body (not shown) fastens the exhaust-gas pipe 16 to the turbine housing 20 by engaging around both flange regions 26, 34. The flange region 26 of the exhaust-gas pipe 16 is arranged downstream of the diffusor region 22 and upstream of the exhaust-gas manifold region 24. The flange region 26 extends in collar form about an outer circumferential surface of the exhaust-gas pipe 16. Specifically, the flange region 26 has a step-shaped structure. The passages 28 extend through the pipe wall of the exhaust-gas pipe 16 in a radially inner portion of the flange region 26.

The passages 28 extend between an outer circumferential surface of the exhaust-gas pipe 16 and an inner circumferential surface of the exhaust-gas pipe 16. The passages 28 form the outlet region or the outlet nozzles of a wastegate duct 36 (illustrated only partially) of the turbine 14 for bypassing the turbine wheel. The wastegate duct 36 has a wastegate valve (not shown) for metering an exhaust-gas flow through the wastegate duct 36 or through the turbine wheel. Specifically, the wastegate duct 36 has an annular space 38 through which the exhaust gas flows into the inlet openings 40 of the passages 28. The annular space 38 is defined or delimited by an outer circumferential surface of the exhaust-gas pipe 16 about the diffusor region 22 and an inner circumferential surface of the turbine housing 20. The exhaust gas leaves the passages 28 and thus the wastegate duct 36 through the outlet openings 42. The outlet openings 42 are arranged in the rear portion of the diffusor region 22 upstream of the exhaust-gas manifold region 24. The outlet openings 42 can, for example, also be arranged downstream of the diffusor region 22 and in the exhaust-gas manifold region 24. In the embodiment shown, the longitudinal axes of the passages 28 each form an acute angle, i.e. an angle of less than 90°, with a longitudinal axis of the diffusor region 16. Preference is given in particular to small inflow angles, for example of less than 45° or 25°. Exhaust gas entering through the passages 28 thus brings about comparatively little swirling when flowing into the exhaust-gas pipe 16.

Figure 3A:
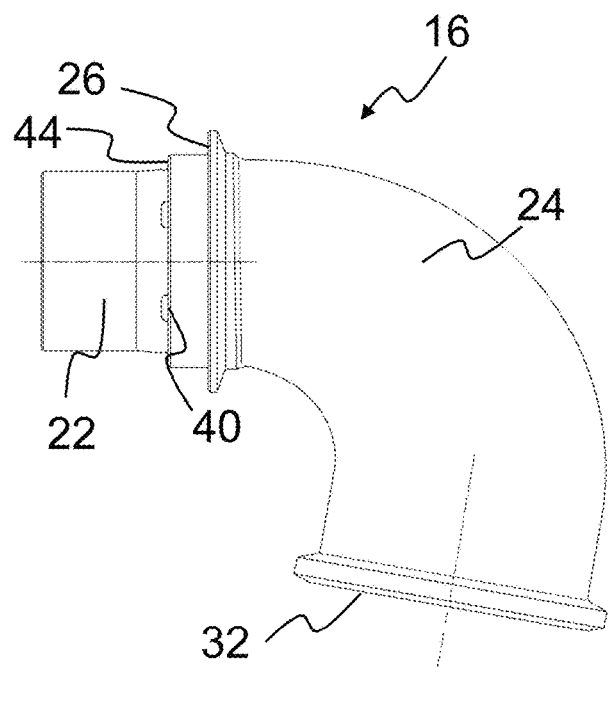
FIG. 3A shows a front view of the exhaust-gas pipe.
Figure 3B:
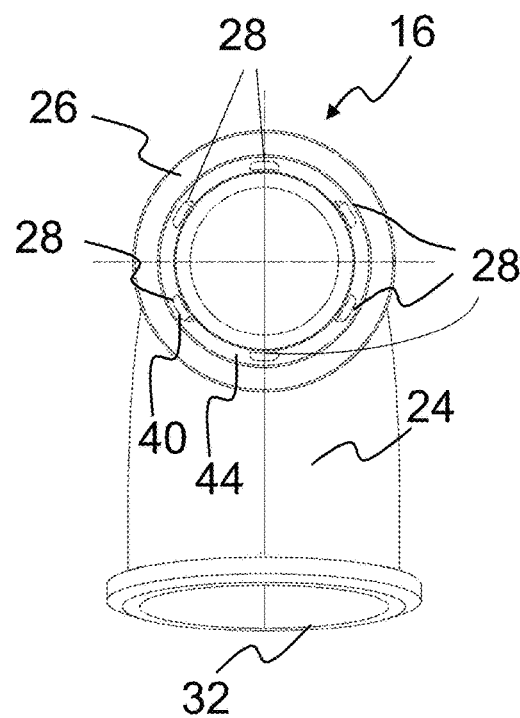
FIG. 3B shows a side view of the exhaust-gas pipe.

As can be gathered from FIGS. 3A and 3B, a total of six passages 28 are provided in the exemplary embodiment shown. The six passages 28 are arranged symmetrically in a circumferential direction about the longitudinal axis of the diffusor region 22. In other embodiments, the exhaust-gas pipe 16 can have more or fewer passages 28 in symmetrical or asymmetrical arrangements. The inlet openings 40 are positioned in an annular surface 44 which lies in a plane perpendicular to the longitudinal axis of the diffusor region 22. The inlet openings 40 are first produced by transverse turning of the annular surface 44. In other words, the passages 28 are not yet completely formed during primary forming, i.e. casting. After primary forming, the passages 28 are blind holes which extend from the outlet openings 42 into the pipe wall of the exhaust-gas pipe 16. As a result of a metal-cutting process, here transverse forming, the passages 28 are opened when forming the annular surface 44, i.e. the inlet openings 40 are created only after primary forming.

The present disclosure is not restricted to the above-described exemplary embodiments. Rather, a plurality of variants and modifications are possible which also make use of the concept of the present disclosure and therefore fall within the scope of protection. In particular, the present disclosure also claims protection for the subject matter and the features of the dependent claims independently of the claims referred back to.

LIST OF REFERENCE SIGNS

10 Turbocharger assembly
12 Compressor
14 Turbine
16 Exhaust-gas pipe
18 Compressor housing
18A Compressor inlet opening
18B Compressor outlet opening
20 Turbine housing
20A Turbine inlet opening
22 Diffusor region
24 Exhaust-gas manifold region
26 Flange region of the exhaust-gas pipe
28 Passage
30 Exhaust-gas-pipe-receiving region
32 Outlet opening of the exhaust-gas pipe
34 Flange region of the turbine housing
36 Wastegate duct
38 Annular space
40 Inlet opening of the passage
42 Outlet opening of the passage
44 Annular surface

The invention claimed is:

1. A turbocharger assembly for an internal combustion engine comprising:
   a turbocharger with a turbine housing;
   an exhaust-gas pipe which is arranged downstream of the turbine housing and has a diffusor region defined by an increase in size of the exhaust-gas pipe cross section and an exhaust-gas manifold region; and
   a wastegate duct which has at least one passage through a pipe wall of the exhaust-gas pipe, wherein the at least one passage is provided downstream of the diffusor region.

2. The turbocharger assembly according to claim 1, wherein the diffusor region extends at least partially into the turbine housing.

3. The turbocharger assembly according to claim 2, wherein the diffusor region extends substantially into the turbine housing.

4. The turbocharger assembly according to claim 1, wherein the exhaust-gas pipe is formed in one piece and/or is a cast part.

5. The turbocharger assembly according to claim 1, wherein the at least one passage is provided upstream of the exhaust-gas manifold region.

6. The turbocharger assembly according to claim 1, wherein the at least one passage is formed such that a flow through the passage is channelled into the exhaust-gas pipe such that the flow from the passage impinges a flow through the exhaust-gas pipe at an angle of less than 90°.

7. The turbocharger assembly according to claim 1, wherein the at least one passage is formed such that a flow through the passage is channelled into the exhaust-gas pipe such that the flow from the passage impinges a flow through the exhaust-gas pipe at an angle of less than 45°.

8. The turbocharger assembly according to claim 1, wherein the at least one passage is formed such that a flow through the passage is channelled into the exhaust-gas pipe such that the flow from the passage impinges a flow through the exhaust-gas pipe at an angle of less than 25°.

9. The turbocharger assembly according to claim 1, wherein a plurality of passages of the wastegate duct through the pipe wall of the exhaust-gas pipe are arranged at equal spaces in a circumferential direction about a longitudinal axis of the exhaust-gas pipe.

10. The turbocharger assembly according to claim 1, wherein an inlet opening of the at least one passage is formed by a metal-cutting process.

11. The turbocharger assembly according to claim 10, wherein the metal-cutting process is a turning process.

12. The turbocharger assembly according to claim 1, wherein an outlet opening of the at least one passage is formed by a casting process.

13. The turbocharger assembly according to claim 1, wherein the diffusor region and the exhaust-gas manifold region at least partially overlap.

14. The turbocharger assembly according to claim 1, wherein the diffusor region extends substantially rectilinearly.

15. The turbocharger assembly according to claim 1, wherein the exhaust-gas pipe further has a flange region for flanging the exhaust-gas pipe onto the turbine housing.

16. The turbocharger assembly according to claim 15, wherein the flange region is arranged downstream of an inlet opening of the exhaust-gas pipe.

17. The turbocharger assembly according to claim 15, wherein the flange region is arranged downstream of the diffusor region.

18. The turbocharger assembly according to claim 15, where the flange region is arranged upstream of the exhaust-gas manifold region.

19. The turbocharger assembly according to claim 15, wherein the at least one passage extends at least partially through the flange region.

20. The turbocharger assembly of claim 1, wherein the internal combustion engine is configured for a commercial vehicle.

21. A motor vehicle comprising:
- a turbocharger assembly for an internal combustion engine having:
- a turbocharger with a turbine housing;
- an exhaust-gas pipe which is arranged downstream of the turbine housing and has a diffusor region defined by an increase in size of the exhaust-gas pipe cross section and an exhaust-gas manifold region; and
- a wastegate duct which has at least one passage through a pipe wall of the exhaust-gas pipe, wherein the at least one passage is provided downstream of the diffusor region.

22. The motor vehicle of claim 21, wherein the motor vehicle is a commercial vehicle.

\* \* \* \* \*